United States Patent Office 2,755,903
Patented July 24, 1956

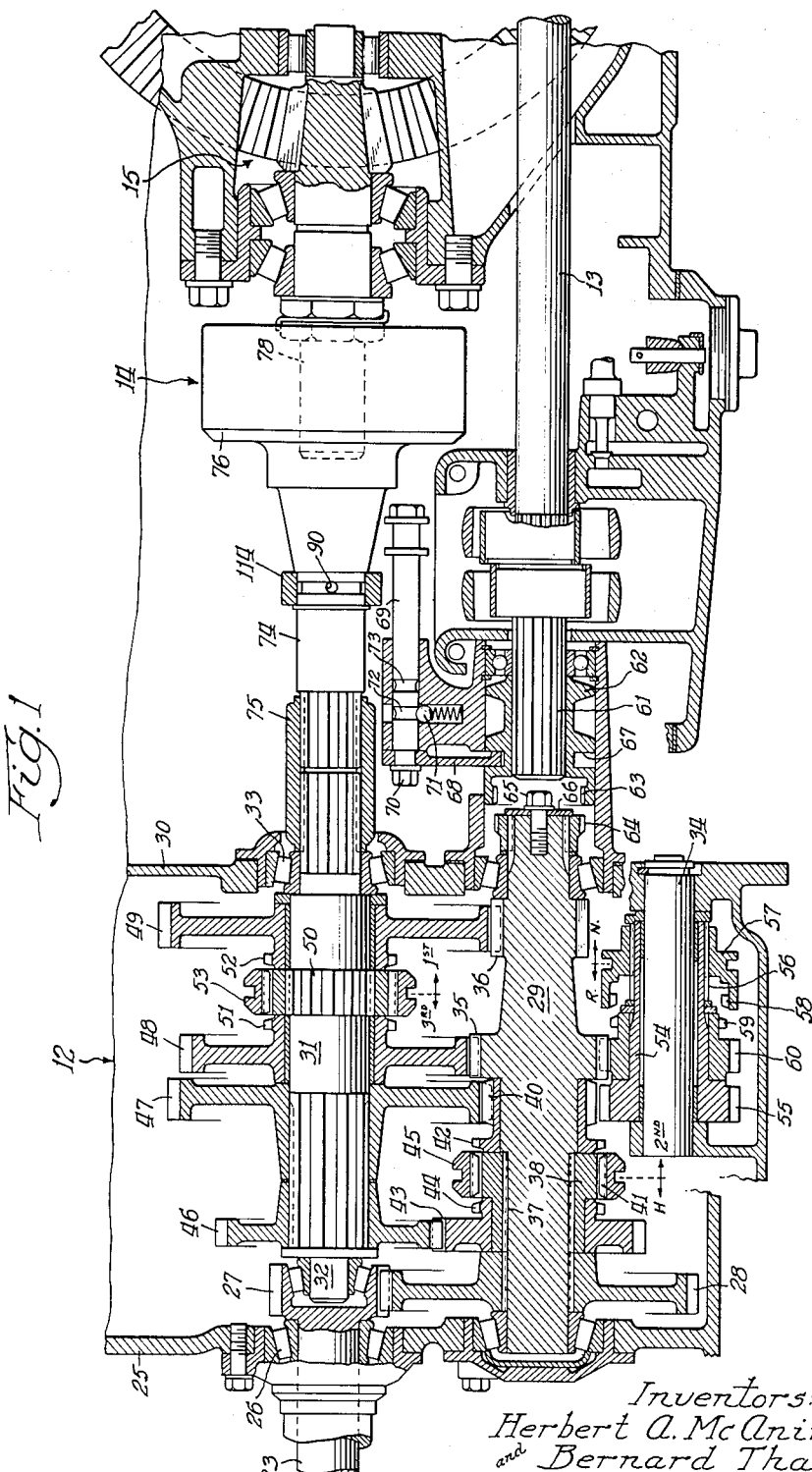

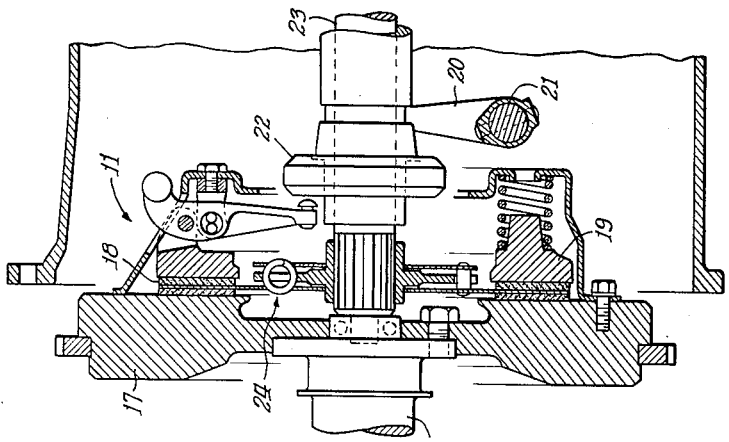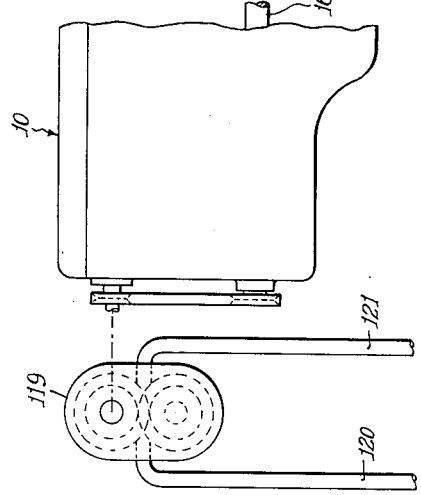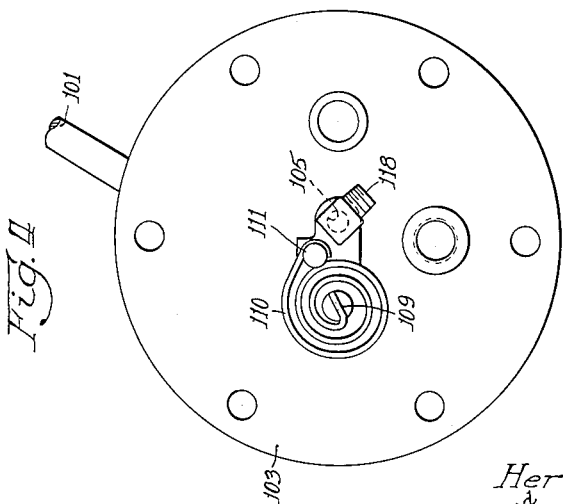

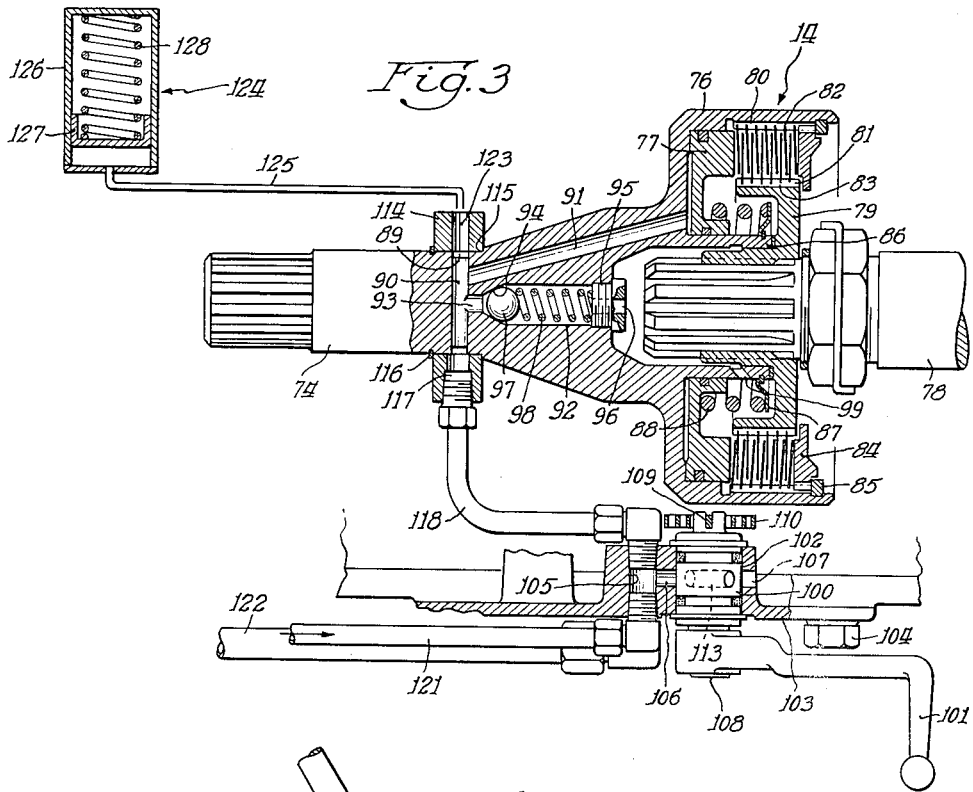
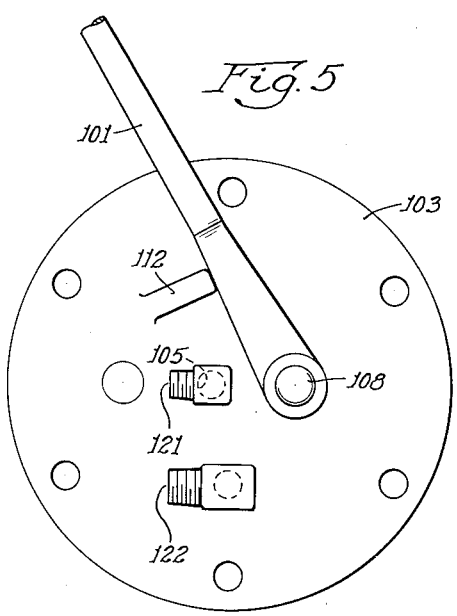

2,755,903
TRANSMISSION

Herbert A. McAninch, Auburn, and Bernard Tharpe, Garrett, Ind., assignors to Borg-Warner Corporation, Chicago, Ill., a corporation of Illinois Application February 11, 1953, Serial No. 336,248

7 Claims. (Cl. 192—113)

The present invention relates in general to power transmitting devices and more particularly to fluid pressure actuated clutches.

The principal object of the present invention is to provide fluid pressure operated clutch structure suitable for disposition between the change speed transmission and driving wheels of an automotive vehicle such as a tractor or truck.

It will be apparent to those skilled in the art that in a tractor or truck, considerable torque is transmitted from the transmission driving shaft to the driving wheels and it is therefore necessary that any clutch disposed between these two elements be capable of transmitting the heavy torque loads. The present invention contemplates utilizing a fluid pressure actuated multiple plate friction clutch for this purpose.

It is a further object of the present invention to provide fluid pressure engaged multiple plate friction clutch structure wherein the fluid pressure transmitting line is provided with a fluid pressure relief valve for limiting the pressure of the fluid applied to the clutch engaging motor and directing any excess fluid onto the friction clutch plates themselves in order to dissipate the heat generated by friction between the adjacent clutch plates prior to full engagement of the clutch.

A further object of the invention is to provide clutch structure as set forth in the immediately preceding paragraph which is further characterized by the provision of a manually adjustable device for varying the pressure at which the relief valve moves to an open position whereby the force of engagement between the driving and driven clutch elements may be either increased or decreased.

A further object of this invention is to provide a manually controlled fluid pressure system for engaging the clutch disclosed herein having a fluid pressure accumulator for, at all times, effecting gradual engagement of the clutch.

The present invention is of particular utility in conventional four-wheel farm tractors having a continuously driven power take-off shaft for providing rotative power for an implement being towed by the tractor. In this connection, the clutching structure disclosed herein is disposed between the output shaft of the conventional change speed transmission and the differential which drives the rear wheels and by manually controlling the engagement and disengagement of this clutching structure it is possible to effect a drive to the power take-off shaft while the drive to the driving wheels of the tractor is either completed or broken. This is of particular importance when the tractor is being utilized to draw and operate farm equipment such as a corn husker which is frequently subjected to an overload, such as occurs when too much grain is received by the implement at any one time. Under such circumstances it is desirable to stop the forward progress of the implement and, at the same time, continue to operate the implement in order to relieve the congestion.

It has been found that by utilizing the excess fluid not needed for effecting engagement of the clutch disclosed herein, for the purpose of cooling the clutch plates, the life of the clutch plates is lengthened considerably and the clutch operates far more satisfactorily than when the plates are allowed to become overheated as a result of friction during slippage of the clutch.

The foregoing and other objects and advantages of the present invention will become apparent from the following detailed description when read in conjunction with the accompanying drawings wherein:

Fig. 1 shows a sectional view of a tractor transmission mechanism having the principal features of the present invention incorporated therein;

Fig. 2 shows schematically the driving engine and pump for supplying fluid under pressure together with a conventional foot pedal operated friction clutch disposed ahead of the transmission mechanism disclosed in Fig. 1;

Fig. 3 is a detail view of the clutch disposed between the transmission and differential together with an illustration of the manually operated spool valve for controlling the engagement and disengagement of the clutch;

Fig. 4 is a detail view of the inside of the mounting plate for the valve mechanism; and Fig. 5 is a detail view of the outside of the mounting plate and the manually operable control lever for controlling the clutch control valve.

With reference now to the drawings, wherein like reference numerals in the different views identify identical parts, the present invention comprises a driving engine 10, a main clutch 11, a conventional change speed transmission mechanism 12, a power take-off shaft 13 and a friction clutch 14 disposed between the transmission 12 and the differential gearing 15 adapted to drive the driving wheels (not shown) of a farm tractor.

The driving engine 10 drives a crank shaft 16 to which a fly wheel 17 is secured. The clutch 11 comprises a friction disc 18 which is movable into engagement with the fly wheel 17 by means of a pressure plate 19. A clutch control lever 20 which is mounted pivotally, as at 21, is actuated by means of a conventional foot operated clutch pedal (not shown) and is capable of reciprocating the collar 22 forwardly along shaft 23 for effecting disengagement of the clutch 11 upon depression of the foot pedal. The shaft 23, as is apparent from Fig. 2 has the clutch plate 18 secured thereto by means of a vibration dampener mechanism 24 and is rotatably mounted by means of bearings 26 in a transverse wall 25 of the transmission casing. The shaft 23 has a gear 27 at its rearward extremity and this gear is adapted to continuously mesh with a gear 28, splined on a countershaft 29 rotatably mounted by means of suitable bearings disposed in the transverse wall 25 and in a second transverse wall 30 of the transmission casing.

A transmission driven shaft 31 is piloted at 32 within the end of shaft 23 and is rotatably mounted in the transverse wall 30 by means of bearings 33. Also mounted within the transmission casing is a second countershaft 34 for providing reverse drive between the shafts 23 and 31.

The countershaft 29 has two integral gears 35 and 36 formed thereon and is splined, as at 37, for receiving a rotatably fixed clutch hub 38. The countershaft 29 is provided with a gear 40 which is rotatable thereon and which gear is provided with clutch teeth 42. Rotatable around the clutch hub 38 is a gear 43 provided with clutch teeth 44. A shiftable clutch collar 45, which may be controlled manually in any well-known manner is provided with internal clutch teeth which mesh with clutch teeth 46 formed on clutch hub 38 and which are adapted to slide longitudinally into clutching engagement with either the clutch teeth 44 or the clutch teeth 42, to respectively connect either the gear 43 or the gear 40 to the countershaft 29.

The transmission driven shaft 31 is provided with two gears 46 and 47 which are each splined thereon and which respectively mesh with gears 43 and 40 rotatably mounted on the countershaft 29. The transmission driven shaft 31 carries two rotatable gears 48 and 49 which respectively mesh with gears 35 and 36 formed integrally on the countershaft 29. A clutch hub 50 is splined to the driven shaft 31 and has external clutch teeth having the same pitch diameter as clutch teeth 51 and 52, respectively formed on gears 48 and 49. A clutch collar 53 continuously meshes with the external clutch teeth on the clutch hub 50 and is movable manually into clutching engagement with either of the sets of clutch teeth 51 and 52 to respectively connect either the gear 48 or the gear 49 to the shaft 31.

Rotatably mounted on the countershaft 34 is a sleeve shaft 54 having a gear 55 integrally formed thereon which gear is adapted to mesh continuously with the gear 47 on the driven shaft 31. The sleeve shaft 54 is provided with longitudinally extending splines 56 for receiving a longitudinally reciprocable clutch collar 57 formed with internal clutch teeth 58 adapted to mesh with external clutch teeth 59 formed on a gear 60 rotatable about the sleeve shaft 54. When the collar 57 is moved to the left to bring the teeth 58 and 59 into clutching engagement, the gears 55 and 60 are rotatable in unison in order to complete a reverse drive between the drive shaft 23 and the driven shaft 31.

The change speed transmission 12 provides four forward drives and one reverse drive from the shaft 23 to the shaft 31. Low speed forward drive between the shafts 23 and 31 is established by moving the clutch collar 53 to the right into clutching engagement with the clutch teeth 52 and a low speed power train is thus established which extends through the meshing gears 27 and 28, through countershaft 29, through meshing gears 36 and 49, and through the clutch collar 53 and hub 50 to the shaft 31.

Second forward speed drive from the shaft 23 to the shaft 31 is established by moving the clutch collar 45 to the right into clutching engagement with the teeth 42, whereupon a drive is established from the drive shaft 23, through the meshing gears 27 and 28 through the countershaft 29 and clutch hub 38, and through the gears 40 and 47 to the shaft 31.

Third forward speed drive from the shaft 23 to the shaft 31 is established by moving the clutch collar 53 to the left into clutching engagement with the teeth 51. This drive proceeds from the shaft 23 through the meshing gears 27 and 28 through the countershaft 29, through the gears 35 and 48 and through the clutch collar 53 and hub 50 to the driven shaft 31.

High speed forward drive is established by moving the clutch collar 45 to the left into clutching engagement with the teeth 44 to thereby establish a drive from the shaft 23 through the gears 27 and 28 through the countershaft 29, clutch hub 38 and collar 45, through intermeshing gears 43 and 46 to the driven shaft 31.

Reverse drive through the transmission is established by moving the clutch collar 57 to the left to bring its teeth 58 into clutching engagement with clutch teeth 59 while clutch collars 45 and 53 occupy their neutral positions, as shown in Fig. 1. The drive thus established extends from the shaft 23 through the gears 27 and 28, through gears 35 and 60, through clutch collar 57 and sleeve shaft 54, and through meshing gears 55 and 47 to the driven shaft 31. It will be noted that during reverse drive, the gears 48 and 49 are driven forwardly by the rotating countershaft gears 35 and 36, but since the clutch collar 53 occupies its neutral position at this time, these gears merely idle about the driven shaft 31.

The power take-off shaft 13 is rotatably mounted in the transmission casing as shown and extends rearwardly of the vehicle. The shaft 13 is provided at its forward end with longitudinally extending splines 61 on which is mounted a reciprocable clutch collar 62. The clutch collar 62 is provided with internal clutch teeth 63 adapted to engage external clutch teeth 64 formed on a clutch collar splined to the countershaft 29 and held thereon against longitudinal movement by means of a suitable bolt 65 and washer 66. The clutch collar 62 is provided with an annular groove 67 for receiving a shift fork 68. The shift fork 68 is secured to a longitudinally movable rod 69 by means of a nut 70 and is movable from the position shown wherein detent 71 engages groove 72 in the shaft 69 to a clutch engaged position with teeth 63 in engagement with teeth 64 when the detent 71 is seated in the notch 73.

The driven shaft 31 of the transmission 12 is drivingly connected to a shaft 74 by means of a collar 75 which is respectively splined to the two shafts 31 and 74. The shaft 74 extends rearwardly from the transmission 12 and is formed with an integral bell-shaped housing 76 which forms an annular cylinder for receiving a fluid pressure actuated piston 77 for effecting engagement of the clutch 14.

A driven clutch shaft 78 has an annular member 79 splined thereto which is disposed concentrically within the bell-shaped housing 76. The bell-shaped housing 76 is provided with a plurality of internal splines 80 and the annular member 79 is provided with a plurality of external splines 81 for respectively receiving driving and driven friction clutch discs 82 and 83. The clutch discs 82 are preferably conically shaped and are adapted to be flattened out when compressed between the driven clutch discs 83. The clutch discs 82 and 83 are peripherally notched for receiving the splines 80 and 81 and accordingly are capable of reciprocation longitudinally but are held fixed arcuately with respect to the annular members 76 and 79.

Also splined to the bell-shaped housing 76 is a reaction plate 84 which is held against axial displacement by means of a stop ring 85 suitably disposed within an annular notch formed within the bell housing 76.

The bell-shaped housing 76 is formed with an inner annular member 86 which, together with the housing 76 forms an annular cylinder for receiving the piston 77 and a stop ring 87 suitably fixed to the inner ring 86 provides an abutment for a compression spring 88 also disposed against the piston 77. The spring 88 functions normally to maintain the piston 77 in its leftward position (as shown) with the friction clutch discs 82 and 83 disengaged. When fluid under pressure is admitted behind the piston 77 the clutch discs are compressed by the piston 77 against the reaction plate 84 to thereby effect frictional engagement between the clutch discs 82 and 83 so as to interconnect shafts 74 and 78. When the clutch 14 is engaged by the application of fluid pressure behind the piston 77, a drive is completed from the transmission 12 to the differential gearing 15 in order to drive the tractor.

The shaft 74 is provided with an annular groove 89 and a transverse aperture 90. The transverse aperture 90 is in communication with the cylinder for receiving the piston 77 by means of an elongated generally axially extending opening 91. The shaft 74 is bored, as indicated at 92, and this bore is in communication with the aperture 90 by means of a relatively short axially extending opening 93. The opening 93 and the bore 92 are connected by means of a valve seat 94. The bore 92 is internally threaded at its right end for receiving an adjusting bolt 95 which is formed with a central aperture 96 therein. Disposed in abutment with the bolt 95 and against a ball valve 97 is a compression spring 98 for holding the ball 97 on the valve seat 94. When fluid under pressure behind the ball 97 increases sufficiently to overcome the bias of the spring 98, the ball 97 moves from its seat 94 and allows fluid to escape through the opening 96. This fluid may then pass through a plurality of radially extending openings 99 formed in the inner annular ring 86 and from this point the fluid flows over the friction clutch discs 82 and 83. It has been found that the application of the fluid relieved by the valve 97 to the clutch discs 82 and 83 serves very adequately as a means for cooling the clutch discs by dissipating the heat generated therein as a result of the friction during movement of the discs into engagement.

Suitable means are provided for controlling the supply of fluid to the clutch actuating piston 77 and this means includes a spool valve 100 which is normally operable by means of a selector lever 101. The spool valve 100 is rotatably mounted within an opening 102 formed in a plate 103 adapted to be mounted on the side of the transmission casing by means of a plurality of mounting bolts 104. The plate 103 is provided with an opening 105 extending therethrough and in communication with the opening 102 by means of an opening 106. The opening 102 also communicates with a second opening 107 which merely leads to the inside of the transmission casing. The spool valve 100 is provided with an integral control shaft 108 to which the manual operating handle 101 is secured and the valve is also provided with a transverse slot 109 on its inner end for receiving one end of a coil spring 110 which is fastened to the plate 103 at its other end by means of a suitable bolt 111. The coil spring 110 functions to hold the valve 100 in the position shown, with the control lever 101 against abutment 112 and with a transverse opening 113 in the valve out of communication with both openings 106 and 107. It is therefore apparent that the valve 100 is normally closed. It is contemplated that movement of the control lever 101 in order to rotate the valve 100, will move the valve so as to bring its central opening 113 into communication with the openings 106 and 107 so as to drain any fluid in the opening 105.

A suitable collector ring 114, mounted on the shaft 74 around the peripheral groove 89, is axially fixed by means of a shoulder 115 and a stop ring 116. The collector ring 114 is provided with a radially extending opening 117 and this opening is connected to the opening 105 by means of a fluid transmitting line 118.

The engine 10 of the vehicle drives a fluid pump 119 of the positive displacement type, the pump 119 drawing fluid through a line 120 from a sump, which consists of the lower portion of the transmission casing, and pumping this fluid into a fluid transmitting line 121 connected to the outer end of the opening 105. A second fluid transmitting line 122 may be provided for conveying fluid, from the portion of the transmission casing which houses the clutch 14, forwardly to the portion of the transmission casing which forms the sump that supplies the pump 119.

The collector ring 114 is provided with an opening 123 which is connected to an accumulator 124 by means of a fluid transmitting line 125. The accumulator 124 comprises a cylinder 126 having a piston 127 therein which is normally urged toward the position shown by means of a compression spring 128. The spring 128 in the accumulator 124 is designed so as to exert sufficient bias on the piston 127 to substantially prevent its movement until the fluid pressure increases sufficiently to commence engaging the clutch discs 82 and 83. When the fluid pressure reaches this value the spring 128 yields and allows some of the fluid to be received in the cylinder 126, so as to insure a gradual engagement of the clutch discs 82 and 83 and a consequent soft engagement of the clutch 14.

Assuming that the clutch 14 is applied to a conventional tractor having a power take-off shaft 13, the operation of the present invention is as follows. The power take-off shaft 13 will be connected to establish a drive to an implement being towed by the tractor and the transmission 12 will be operated in the conventional manner in order to complete the desired drive to the differential 15 in order to effect movement forwardly or reversely of the tractor and the implement being towed thereby. If at any time it is desired to stop the forward or reverse movement of the tractor and the implement towed thereby and at the same time complete a drive to the implement in order to relieve any plugged condition which may exist in the implement, as when the tractor is towing a corn husker, grain combine or hay bailer, it is only necessary for the operator of the tractor to move the selector lever 101, in opposition to the bias of the spring 110. Such movement of the lever 101 rotates the spool valve 100 and relieves the fluid pressure applied to the clutch 14 through the fluid transmitting lines 121, 105, 118.

As soon as the plugged condition of the implement being towed by the tractor is relieved, and it is desired to again move the implement forwardly or reversely, the operator of the tractor merely releases the control lever 101, the spring 110 rotating the lever until it strikes the abutment 112. This effects a closure of the spool valve 100 and fluid under pressure may immediately build up in the accumulator cylinder 126 and in the cylinder behind the piston 77 to effect a gradual engagement of the clutch 14. Due to the fact that the shaft 74 is rotating while the shaft 78 is stationary during the disengaged condition of the clutch 14, the gradual engagement of the clutch discs will cause certain friction between them. This friction generates a rather considerable amount of heat which, it has been found, must be dissipated in order to prevent permanent damage to the clutch discs. As soon as the pressure behind the piston 77 builds up to a predetermined value above the pressure necessary to effect complete engagement of the clutch, the relief valve 97 opens and the excess fluid escapes through the bore 92 and through openings 99 from whence it comes in contact with the clutch discs 82 and 83. The fluid thus escaping cools the clutch discs and prevents the damage which would otherwise occur from overheating. The excess fluid may escape, after having been applied to the clutch discs, between the splines formed on the driven clutch member 79 from whence it drops to the bottom of the casing.

The present invention provides a simple and adequate means for cooling a fluid pressure actuated clutch of the type adapted to carry torque loads of the magnitudes involved in the drive from a tractor engine to its traction wheels. It is contemplated that numerous changes and modifications may be made in the present invention without departing from the spirit or scope thereof.

What is claimed is:

1. In combination, driving and driven clutch members, fluid pressure actuated means operable to move said members together to effect frictional engagement therebetween, a source of fluid pressure for operating said fluid pressure actuated means, and fluid pressure transmitting means connecting said fluid pressure source and said clutch members and including a fluid pressure relief valve movable to an open position when the fluid pressure reaches a predetermined value for directing excess fluid against said members to effect cooling thereof.

2. In combination, clutch structure comprising a plurality of interleaved driving and driven clutch discs, a reaction plate disposed at one side of said discs, a pressure plate for compressing said discs against said reaction plate to thereby effect driving engagement between said driving and driven discs, a source of fluid pressure for actuating said pressure plate, and fluid pressure transmitting means connecting said fluid pressure source and said discs and including a fluid pressure relief valve movable to an open position when the fluid pressure reaches a predetermined value for directing excess fluid against said discs to effect cooling thereof.

3. In combination, coaxial driving and driven members, clutch discs respectively carried by said driving and driven members, said clutch discs being frictionally engageable for completing a drive between said members, a fluid pressure operated motor for effecting frictional engagement of said clutch discs, a source of fluid pressure for actuating said motor, and fluid pressure transmitting means connecting said fluid pressure source and said discs and including a fluid pressure relief valve movable to an open position when the fluid pressure reaches a predetermined value for directing excess fluid against said discs to effect cooling thereof.

4. In combination, coaxial driving and driven members, each of said members having a plurality of clutch discs splined thereto and arranged in interleaved relation, said clutch discs being frictionally engageable for completing a drive between said members, one of said members including means defining a fluid pressure actuated motor, a source of fluid pressure for actuating said motor, and fluid pressure transmitting means connecting said fluid pressure source and said discs and including a fluid pressure relief valve movable to an open position when the fluid pressure reaches a predetermined value for directing excess fluid against said discs to effect cooling thereof.

5. In combination, coaxial driving and driven members, each of said members having a plurality of clutch discs splined thereto and arranged in interleaved relation, said clutch discs being frictionally engageable for completing a drive between said members, one of said members including means defining a fluid pressure actuated motor, a source of fluid pressure, means defining a fluid pressure transmitting line interconnecting said source and said motor, control valve means in communication with said transmitting line for controlling the supply of fluid pressure to said motor, means defining a second fluid pressure transmitting line in communication with said first-named fluid pressure transmitting line and said clutch discs, and a check valve in said second fluid pressure transmitting line for regulating the fluid pressure applied to said motor for effecting engagement of said clutch discs and for directing excess fluid against said discs for cooling the same.

6. In combination, a pair of friction clutch members, a fluid pressure operated motor for engaging said members, a source of fluid pressure for actuating said motor, a relief valve for controlling the pressure of the fluid applied to said motor and effective to divert the excess fluid above a predetermined pressure to said clutch members for cooling the same, and means for adjusting said relief valve to vary said predetermined pressure and thereby change the force of engagement of said clutch members.

7. In combination, a pair of friction clutch members, a fluid pressure operated motor for engaging said members, a source of fluid pressure, means defining a fluid pressure transmitting line interconnecting said pressure source and said motor, means defining a second fluid transmitting line in communication with said first-named line and directed toward said clutch members, a relief valve disposed in said second fluid transmitting line and effective to control the pressure of the fluid applied to said motor and to relieve fluid above a predetermined pressure and direct the same to said clutch members for cooling them, and means for adjusting said relief valve to vary said predetermined pressure and thereby change the force of engagement of said clutch members.

References Cited in the file of this patent

UNITED STATES PATENTS

| | | |
|---|---|---|
| 1,293,711 | Church | Feb. 11, 1919 |
| 1,801,744 | Hile et al. | Apr. 21, 1931 |
| 2,140,687 | Brown | Dec. 20, 1938 |
| 2,352,270 | Land et al. | June 27, 1944 |
| 2,512,360 | McLean | June 20, 1950 |
| 2,614,396 | Ratermann | Oct. 21, 1952 |
| 2,619,848 | Carnagua | Dec. 2, 1952 |

FOREIGN PATENTS

| | | |
|---|---|---|
| 524,702 | Great Britain | Aug. 13, 1940 |
| 992,998 | France | July 18, 1951 |